Figure 1:
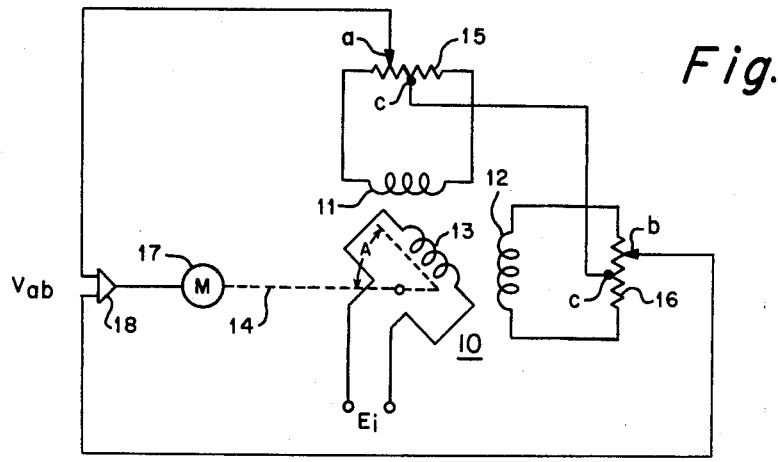

Jan. 26, 1960   D. A. GOLDMAN   2,922,579
ELECTRO-MECHANICAL VECTOR SOLVER AND RESOLVER COMPUTER
Filed April 13, 1956   3 Sheets-Sheet 1

INVENTOR.
DAVID A. GOLDMAN
BY
ATTORNEYS

Jan. 26, 1960  D. A. GOLDMAN  2,922,579
ELECTRO-MECHANICAL VECTOR SOLVER AND RESOLVER COMPUTER
Filed April 13, 1956  3 Sheets-Sheet 3

INVENTOR.
DAVID A. GOLDMAN
BY
ATTORNEYS

United States Patent Office 2,922,579
Patented Jan. 26, 1960

2,922,579

ELECTRO-MECHANICAL VECTOR SOLVER AND RESOLVER COMPUTER

David A. Goldman, Yorktown Heights, N.Y.

Application April 13, 1956, Serial No. 578,156

13 Claims. (Cl. 235—189)

(Granted under Title 35, U.S. Code (1952), sec. 266)

The invention described herein may be manufactured and used by or for the Government of the United States of America for governmental purposes without the payment of any royalties thereon or therefor.

The present invention relates to an electro-mechanical vector solver and a resolver computer, and more particularly to a computer which converts a pair of vectors 90° apart into a final vector.

One present arrangement for converting vectors from rectangular coordinates into polar coordinates utilizes an electric resolver with two pairs of mutually perpendicular coils. One pair of coils is mounted on a shaft for rotation, and voltages proportional to rectangular coordinates are fed into the other pair of windings. An amplifier, across one of the coils mounted on the shaft, energizes a motor driving a shaft until the voltage in the amplifier is canceled or nulled. The magnitude of the resultant of the two components is then read across the remaining coil mounted on the shaft and the angular displacement of the shaft is the angle in polar coordinates. With the use of servo systems in conjunction with this arrangement, outputs can be obtained in either electrical or mechanical form.

One disadvantage of the arrangement described above is that the input voltages are usually derived from high and varying impedance outputs, and the inputs of a resolver such as the one just described are of a relatively low impedance. Without booster amplifiers this type of lashup loads the voltage sources and yields results which are inaccurate in both phase and magnitude. If booster amplifiers are used, the amplifiers must be highly stable, have high input impedances and low output impedances and the amplifier must be made virtually independent of line voltage variation. The booster amplifier must have a constant gain and a low distortion factor throughout a great range of voltage inputs to the amplifier because any variation in amplifier gain affects the solution in a directly proportional manner. Also, the two booster amplifiers used with each resolver must be matched. If a booster amplifier is used and meets the aforementioned requirements, the amplifier tends to be very heavy and costly requiring high gains and large amounts of inverse feedback.

The present arrangement proposes to overcome the disadvantages in connection with the prior (resolver) computers, such as the one described above, by providing a (resolver) computer utilizing servo type amplifiers used to drive a signal to null; therefore, the amplifier gains are not critical. In addition, high resistance potentiometer devices which do not draw high current from the wiper arms are used, thereby permitting high accuracy.

An object of the present invention is the provision of a vector solver and resolver computer which is capable of converting voltages or mechanical positions from rectangular coordinates into polar coordinates.

Another object is to provide a vector solver and resolver computer which utilizes bridge techniques throughout to accomplish vector resolution and solving.

A further object of this invention is the provision of a fully automatic, self-balancing, electro-mechanical vector solver and resolver computer which utilizes a plurality of servos operating simultaneously, rather than one working as a consequence of another's final position.

Still another object is to provide a computer utilizing a synchro transformer provided with potentiometers having movable contacts connected by shafts to slide in synchronism, said shafts indicating upon balancing the output of the computer.

Figure 3:
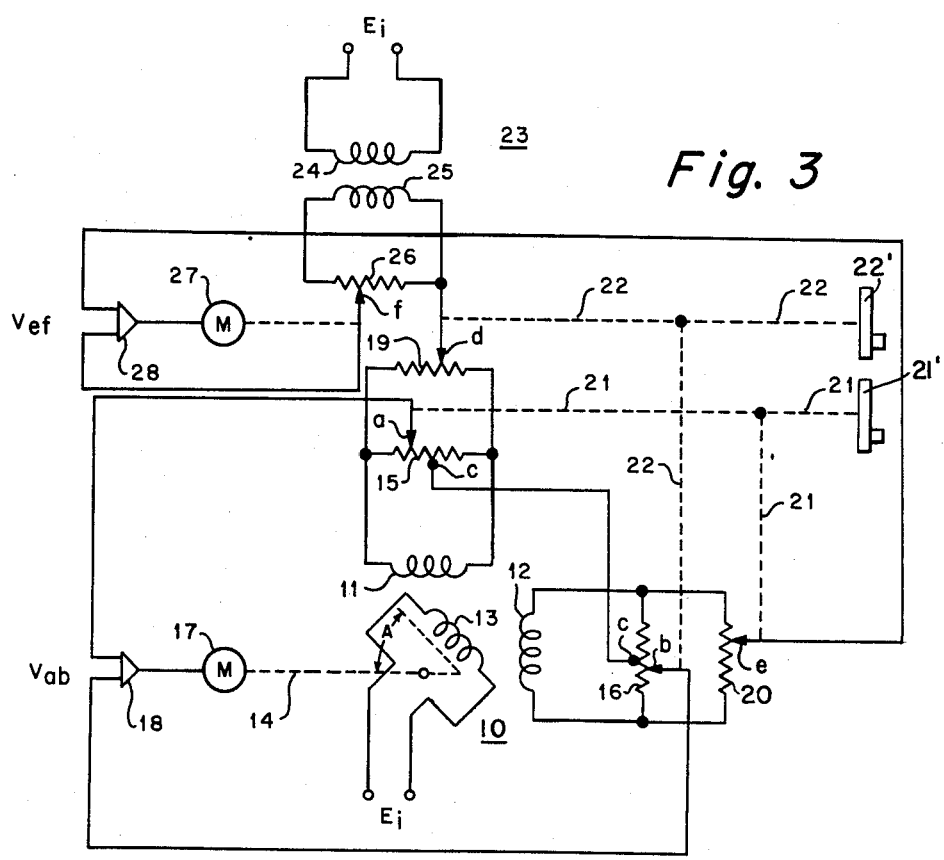
Figure 4:
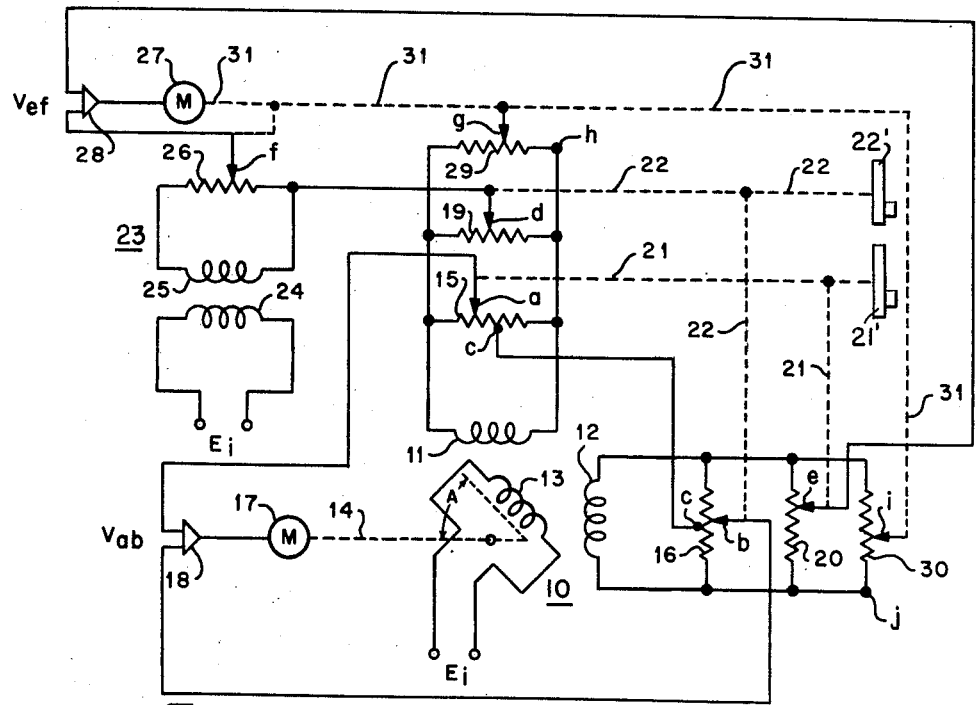
Figure 5:
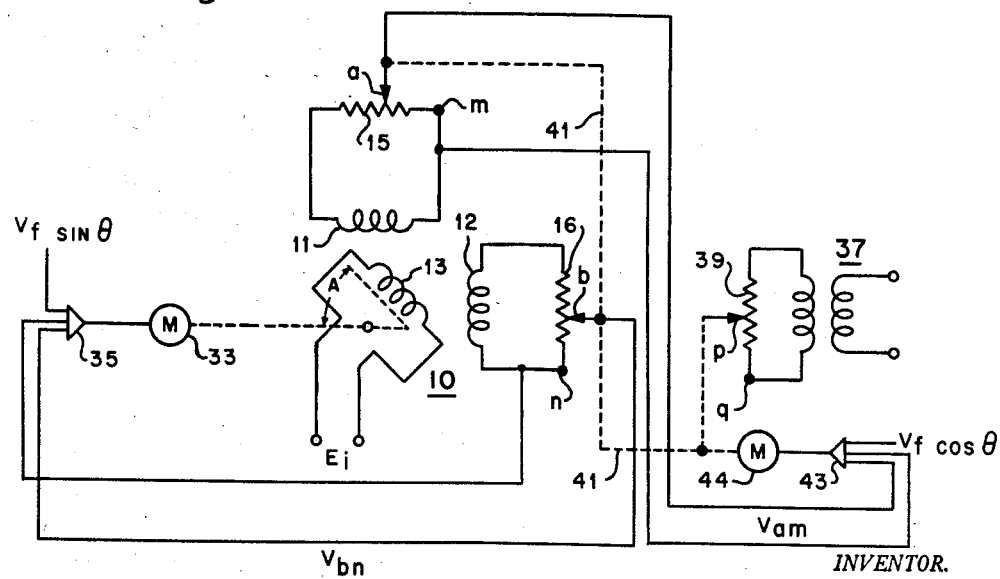

The exact nature of this invention as well as other objects and advantages thereof will be readily apparent from consideration of the following specification relating to the annexed drawing in which:

Figs. 1 through 4 show several specific arrangements of successive complexity and usefulness; and Fig. 5 shows an embodiment of the invention designed for a special case.

The basic principle of this invention is illustrated in the simplified circuit of Fig. 1. A synchro or resolver designated generally by numeral 10 contains a pair of stationary coils 11 and 12 at right angles to each other and a movable coil 13 mounted on shaft 14 for rotation therewith. Across coils 11 and 12 are connected a pair of high resistance potentiometers 15 and 16, provided with movable contacts or wipers $a$ and $b$, respectively. The potentials at wipers $a$ and $b$ are designated $V_a$ and $V_b$, respectively. The center taps $c$ of potentiometers 15 and 16 are tied together and the common potential at this point is identified as $V_c$. Movable coil 13 is supplied with a constant sinusoidal input $E_i$, such as 26 volts, 400 cycles per second. The angular position A of coil 13 is measured from the position of coil 13 wherein coil 12 receives a minimum or zero induced voltage and coil 11 receives a maximum induced voltage. Thus, at A degrees for coil 13, coil 12 receives $E_iK \sin A$ volts and coil 11 receives $E_iK \cos A$ volts, where K is the transformation ratio of synchro 10.

If the whole resistance value of 15 is chosen to equal 16 and is defined as $R_L$, then the resistance between point $a$ and the center tap $c$ of 15 is defined as $R_a$, and between $b$ and center tap $c$ of 16 the resistance is defined as $R_b$. An electric motor 17 driving shaft 14 is energized by the output of amplifier 18 which is supplied by the voltage difference between points $a$ and $b$, defined as $V_{ab}$.

The operation of this circuit is analyzed as follows: Contacts $a$ and $b$ are positioned on their respective potentiometers which may be indexed so that $R_a$ and $R_b$, respectively, are directly proportional to the input voltages $V_y$ and $V_x$ which are to be resolved into a single polar vector. The voltages $V_y$ and $V_x$ represent vectors separated by 90 degrees in this arrangement. Therefore, if the desired output vector is defined as $V_f$, then $V_y$ and $V_x$ may be described as $V_f \sin \theta$ and $V_f \cos \theta$, where $\theta$ is the angle of $V_f$ formed by the components $V_y$ and $V_x$ represented by $R_a$ and $R_b$, respectively. Then:

(1) $\quad R_a = K_1 V_f \sin \theta \text{ and } R_b = K_1 V_f \cos \theta$ where $K_1$ is a constant.

If angle A is the angular position of coil 13, as defined above, then the voltages induced across coils 11 and 12 would be $E_iK \cos A$ and $E_iK \sin A$, respectively, where K is the transformation ratio of synchro 10.

Therefore, (2) $$V_{ac} = \frac{R_a}{R_L} E_i K \cos A$$

and (3) $$V_{bc} = \frac{R_b}{R_L} E_i K \sin A$$

Substituting for $R_a$ and $R_b$ in (2) and (3) the definitions from (1).

(4) $$V_{ac} = \frac{E_i K K_1 V_f \sin\theta}{R_L} \cos A$$

and (5) $$V_{bc} = \frac{E_i K K_1 V_f \cos\theta}{R_L} \sin A$$

Then $$V_{ab} = V_{ac} - V_{bc} = \frac{E_i K K_1 V_f}{R_L} \times (\cos A \sin\theta - \sin A \cos\theta)$$

or (6) $$V_{ab} = \frac{E_i K_1 V_f K}{R_L} [\sin(\theta - A)]$$

When, in the arrangement of Fig. 1, the input to amplifier 18 is nulled, then $V_{ab}=0$. This occurs when $\theta = A$ and $180° + A$ where A is the stable null rule, in view of Equation 6. Thus, the circuit of Fig. 1 automatically rotates coil 13 to an angle A which is the polar angle $\theta$ of the vector $V_t$ which is the resultant of the two input components.

Figure 2:
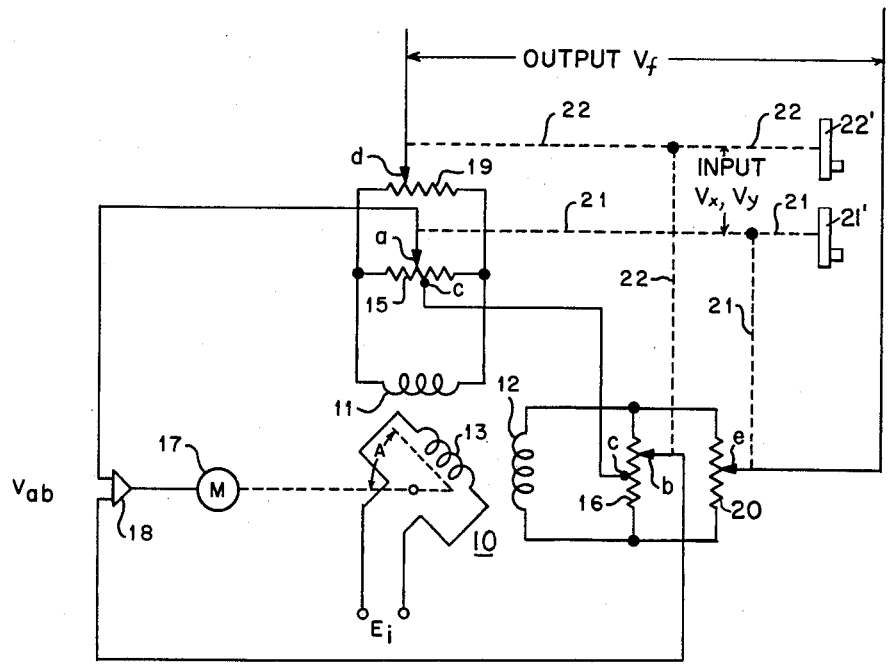

Fig. 2 shows a modification of the arrangement of Fig. 1 capable of producing a voltage which is proportional to the final vector magnitude $V_t$ as well as determining its angle. In this arrangement, a second pair of high resistance potentiometers 19 and 20 identical to each other are placed across coils 11 and 12, respectively, having movable contacts or wipers $d$ and $e$. Wipers $a$ and $e$ are rigged together by a linkage or transmission 21 of conventional design causing these contacts to slide in synchronism at the same rate along their respective potentiometers, and always with $Ra = Re$. Contacts $b$ and $d$ are likewise rigged together in this manner, with $Rb = Rd$. $Rd$ and $Re$ are defined as the resistance from the centers of potentiometers 19 and 20, respectively, in the same manner as $Ra$ and $Rb$.

Using an analysis similar to that applied in connection with Fig. 1, $$V_{dc} = \frac{E_i K K_1 V_f \cos\theta \cos A}{R_L}$$

and $$V_{ec} = \frac{E_i K K_1 V_f \sin\theta \sin A}{R_L}$$

Since $A = \theta$ (7) $$V_{ed} = \frac{E_i K K_1 V_f}{R_L}(\cos^2\theta + \sin^2\theta)$$

or (8) $$V_{ed} = \frac{E_i K K_1}{R_L} V_f$$

Everything in parenthesis is a constant: thus (9) $$V_{ed} = K' V_f$$

where $K'$ is a constant.

Equation 9 shows that the voltage $V_{ed}$ produced across wipers $d$ and $e$ is one which is proportional to the resolved vector $V_t$, and, thus, a voltage measurement taken across wipers $e$ and $d$ in the arrangement of Fig. 2 will give a direct reading of the value of the final vector $V_t$. Its angle, of course, is indicated by angle A, the position of coil 13 when the input to amplifier 18 is nulled.

The computer of Fig. 2 is operated as follows:

The input is mechanical in form and may be fed manually, such as by the use of calibrated cranks 21' and 22', through respectively associated transmission linkages 21 and 22 separately adjusting contacts $a$, $b$, $d$ and $e$ to points on their respective potentiometers picking off $R_a$ and $R_b$ proportional to input vectors $V_y$ and $V_x$, respectively. In response to the voltage input $V_{ab}$, amplifier 18 will energize motor 17 in the direction of nulling the input. Coil 13 will eventually settle in a final angular position A which is the polar angle of vector $V_t$, and voltage $V_{ed}$ measured across wipers $e$ and $d$ will be a direct indication of the magnitude of $V_t$, as seen from Equation 9 above.

Fig. 3 illustrates a computer similar to that of Fig. 2 with provision for indicating the magnitude of vector $V_t$ as a contact position on a potentiometer rather than as a potential difference. In some applications, a mechanical output is more convenient than an electrical output. A transformer 23 having coils 24 and 25, is supplied with $E_i$, a potentiometer 26 of resistance $R_{26}$, and wiper $f$, located across coil 25. The resistance between contact $f$ and the lead to contact $d$ is defined as $R_{df}$. A motor 27 energized by amplifier 28 slides wiper $f$, while amplifier 28 is supplied with $V_{ef}$, the potential across contacts $e$ and $f$. Motor 27 moves contact $f$ in the direction of nulling $V_{ef}$.

With this arrangement,

(10) $$V_{fd} = \frac{E_i K_2 R_{df}}{R_{26}}$$

where $K_2$ is the transformation ratio of transformer 23.

By inspection,

(11) $$V_{ed} - V_{fd} = V_{ef}$$

And from Equation 8, $$V_{ed} = \frac{E_i K K_1 V_f}{R_L}$$

Substituting in (11), $V_{ef} = 0$, when nulled,

(12) $$\frac{E_i K K_1 V_f}{R_L} = \frac{E_i K_2 R_{df}}{R_{26}}$$

(13) $$V_f = \frac{R_f}{K_3}$$

If $K_3$, a constant, is defined as resistance per turn of coil, then it is readily seen that potentiometer 26 may be calibrated to indicate the magnitude of $V_t$ directly.

In the operation of the computer of Fig. 3, the input vectors $V_x$ and $V_y$ are fed in mechanically through transmission lines 22 and 21, respectively, adjusting resistance $R_a$ proportional to $V_y$, and resistance $R_b$ proportional to $V_x$. The arrangement balances itself similarly to that shown in Fig. 2 with inputs to both amplifiers 18 and 28 being nulled. The angular position A of rotor 13 will indicate the polar angle $\theta$ of the resolved vector $V_t$, while the magnitude of the latter is read directly from the position of wiper $f$ along calibrated potentiometer 26.

Fig. 4 shows an arrangement similar to that of Fig. 3 in which a third pair of potentiometers 29 and 30 is added for the purpose of permitting voltage vectors to be fed into the system without first converting the vectors into mechanical magnitudes. Slidable contacts or wipers $g$ and $i$ on potentiometers 29 and 30 identical to each other are geared together by transmission 31 to move so as to mark off the same portion of their respective potentiometers at all times. The wipers $g$ and $i$ are also linked through transmission 31 to wiper $f$ on potentiometer 26. Since potentiometer 26 is calibrated along its length to represent the magnitude of the resultant vector $V_t$, wipers $g$ and $i$ are made to move in such a manner as to measure off resistive values equal to that marked off by wiper $f$ on potentiometer 26.

Thus, if $h$ and $j$ represent potential measuring points on potentiometers 29 and 30, respectively, it will be seen that voltages $V_{gh}$ and $V_{ij}$ will assume the following values:

(14) $$V_{gh} = \frac{E_i K \cos\theta R_{gh}}{R_L}$$

(15) $$R_{gh} - R_f = K_3 V_f$$

from (13).

Substituting in (14),

(16) $$V_{gh} = \frac{E_i K K_3 V_f \cos\theta}{R_L}$$

or $V_{gh}$ is proportional to $V_f \cos\theta$.

By the same reasoning, $V_{ij}$ is proportional to $V_f \sin\theta$.

Since $V_f \cos\theta$ and $V_f \sin\theta$ represent the voltage input vectors to be applied to the system through transmissions 21 and 22, respectively, it is only necessary to adjust the latter mechanical trains until the proper voltage readings $V_{gh}$ and $V_{ij}$ appear, without first having to convert the voltage magnitudes into mechanical positions on potentiometers 15 and 16.

Fig. 5 shows an alternate arrangement suitable for use in the special case in which the resultant of the input vectors is restricted to two adjacent quadrants, as for example, in quadrants I and IV.

Synchro 10 with driving motor 33 and potentiometers 15 and 16 may be identical to that shown in the previous figures. A transformer 37 is supplied with any uniform A.C. voltage at its input end, with potentiometer 39 and wiper $p$ across its output coil. Wipers $a$, $b$, and $p$ are mechanically linked together by transmission 41. Wipers $a$ and $b$ are always identically oriented on their respective potentiometers while wipers $p$ may be driven at any rate along potentiometer but directly proportional to wipers $a$ and $b$.

Amplifier 35 drives motor 33 in the direction of nulling its input signal which is the difference of one input vector $V_f \sin\theta$ and the potential $V_{bn}$ on potentiometer 16. In a like manner, amplifier 43 driving motor 44 is supplied with the other input signal $V_f \cos\theta - V_{am}$. Thus, it is seen that, after balancing,

(17) $$V_f \sin\theta = V_{bn}$$

and

(18) $$V_f \cos\theta = V_{am}$$

Also, from inspection of the circuitry of Fig. 5,

(19) $$V_f \sin\theta = V_{bn} = \frac{R_{bn}}{R_L} E_i K \sin A$$

(20) $$V_f \cos\theta = V_{am} = \frac{R_{am}}{R_L} E_i K \cos A$$

It may be shown that Equations 19 and 20 are true only if angle $A$ = angle $\theta$:

Assume $\theta > A \geq 0°$ in (20), then $V_f > K'' E_i$, where $K''$ is a constant lumping the transfer constant of the potentiometer and the portion of the potentiometer marked off by wipers $a$ and $b$.

But, in Equation 19, if $\theta > A \geq 0°$, then $V_f < K'' E_i$. Therefore, (19) and (20) are not satisfied.

Concluding the above reasoning, it is shown that the only condition in which solution of (19) and (20) may be satisfied is where $\theta = A$, in which case the following is found:

(21) $$V_f = K'' E_i = \frac{R_{am}}{R_L} K E_i = \frac{R_{bn}}{R_L} K E_i$$

Therefore, wipers $a$ and $b$ balance at a point on their respective potentiometers proportional to the resultant vector $V_f$ and potentiometers 15 and 16 or transmission 41 may be calibrated for this purpose. Wiper $p$ on potentiometer 39 is added for the purpose of selecting a voltage which is proportional to the positions of wipers $a$ and $b$, thereby giving the resultant voltage vector $V_f$ directly.

Although the foregoing arrangements have been described in connection with converting a pair of right angled vectors into a single polar vector, it should be understood that the principles of this invention may be used for resolving a polar vector into its component parts, solving any pair of vectors, or solving three dimension problems. In such uses, devices utilizing the principles of this invention would be incorporated in more comprehensive arrangements for accomplishing the desired purpose.

Some of the advantages of the computers described above should now be apparent. For example, all resolvers are operated at a single input voltage and are terminated in equal specified loads, namely, the potentiometers, each pair of which is of the same resistance value. All the amplifiers disclosed are of the servo type and are utilized to drive the signal to null and therefore the gains of the amplifiers are not critical. The potentiometers are used strictly as such and no current is drawn from the wiper arms after the system becomes balanced. Thus, the potentiometers can have high resistance and high accuracy.

Also, the resolver transformation ratio used throughout the discussion need only be constant throughout the normal variation of supply voltage and frequency. The circuits are completely accurate and the accuracy of the system is limited only to the precision of the resolvers and potentiometers at their best operating conditions. The invention is not critically dependent on amplifier stability, distortion, etc. The use of bridge techniques throughout enhances the possible accuracy of the arrangements, while another factor which aids in the accuracy of the instant devices is the fact that a minimum variation in phase shift gives best possible results when the difference of two signals of approximately equal magnitude is taken. Thus, it is seen that the instant device is inherently of greater accuracy, is lower in weight because of its simplicity, will cost less, would be easier to manufacture, and is inherently easier to align.

Certain variations from the particular arrangements described should now be apparent. The banks of potentiometers shown schematically on each stationary synchro coil may in fact utilize a single potentiometer winding with a plurality of wipers. Another arrangement in which tandem potentiometers are used might be preferred to gearing of the potentiometers. Of course, any type of potentiometer, including those of the induction type may be preferred.

Various other modifications are contemplated and may obviously be resorted to by those skilled in the art without departing from the spirit and scope of the invention, as hereinafter defined by the appended claims, as only preferred embodiments thereof have been disclosed.

What is claimed is:

1. In a computer, a rotor coil and a pair of perpendicularly arranged stator coils inductively coupled to said rotor coil, means supplying a uniform A.C. voltage input to said rotor coil, potentiometer means coupled across each of said stator coils, a wiper for each of said potentiometer means adjustable to permit proportions of each said potentiometer means to be selected, respectively, in accordance with a pair of input vectors to be solved, shaft means driving said rotor coil, motor means to drive said shaft means, and amplifier means having as input the potential across said wipers to drive said motor means in the direction of cancelling said input and ultimately positioning said rotor coil at an angle to null said potential across said wipers, said angle thereby being the polar angle of the resultant vector of said pair of input vectors.

2. A computer for combining right angled vectors, comprising, a rotor coil and a pair of stator coils inductively coupled to said rotor coil, means supplying a uniform A.C. voltage input to said rotor coil, potentiometer means coupled across each of said stator coils, the center taps of which are tied to a common point, an independently adjustable wiper for each of said potentiometer means for selecting said input vectors, shaft means driving said rotor coil, motor means to drive said shaft means, and amplifier means having as input the potential across said wipers to drive said motor means in the direction of cancelling said input and ultimately positioning said rotor coil at an angle to null said potential across said wipers, said angle thereby being the polar angle of the resultant vector of said input vectors.

3. In a computer for solving right angled vectors, a rotor coil and a pair of perpendicularly arranged stator coils inductively coupled to said rotor coil, means supplying a uniform A.C. voltage input to said rotor coil, potentiometer means coupled across each of said stator coils, the center taps of which are tied to a common point, an independently adjustable wiper for each of said potentiometer means for selecting said input vectors, shaft means driving said rotor coil, motor means to drive said shaft means, amplifier means having as the potential across said wipers to drive said motor means in the direction of cancelling said input and ultimately positioning said rotor coil at an angle to null said potential across said wipers, said angle thereby being the polar angle of the resultant vector of said input vectors, and further means indicating the magnitude of said resultant vector.

4. In a computer, a rotor coil and first and second stator coils inductively coupled to said rotor coil, means supplying a uniform A.C. voltage input to said rotor coil, first and second potentiometer means across each of said first and second stator coils, respectively, first and second wipers for each of said potentiometer means, first transmission means joining a first pair of said wipers for cooperative movement along their respective potentiometer means, said first pair of wipers consisting of said first wiper on said first potentiometer means and said second wiper from said second potentiometer means, second transmission means joining the second pair of said wipers also for cooperative movement along their respective potentiometer means, servo means for driving said rotor coil, said servo means having as input the potential across said first wipers on each of said potentiometer means to position said rotor coil in the direction of cancelling said input and ultimately balancing said rotor coil at an angle to null said input potential, and means for adjusting independently of each other each of said first wipers on each of said potentiometer means permitting selection of a portion of each respective potentiometer means in accordance with the magnitude of one of said input vectors whereby said final angle of said rotor coil is the polar angle of the resultant vector of said pair of input vectors and the potential across said second wipers of said potentiometer means is proportional to the magnitude of said resultant vector.

5. In a computer, a rotor coil and first and second perpendicularly arranged stator coils inductively coupled to said rotor coil, means supplying a uniform A.C. voltage input to said rotor coil, first and second potentiometer means across each of said first and second stator coils, respectively, first and second wipers for each of said potentiometer means, first transmission means joining a first pair of said wipers for cooperative movement along their respective potentiometer means, said first pair of wipers consisting of said first wiper on said first potentiometer means and said second wiper from said second potentiometer means, second transmission means joining the second pair of said wipers also for cooperative movement along their respective potentiometer means, servo means for driving said rotor coil, said servo means having as input the potential across said first wipers on each of said potentiometer means to position said rotor coil in the direction of cancelling said input and ultimately balancing said rotor coil at an angle to null said input potential, and means for adjusting independently of each other said first and second pair of wipers permitting selection of a portion of each respective potentiometer means in accordance with the magnitude of one of said input vectors whereby said final angle of said rotor coil is the polar angle of the resultant vector of said pair of input vectors and the potential across said second wipers of said potentiometer means is proportional to the magnitude of said resultant vector.

6. A computer for solving a pair of right angled vectors, comprising, a rotor coil and first and second stator coils inductively coupled to said rotor coil, means supplying a uniform A.C. voltage input to said rotor coil, first and second potentiometer means across said first and second stator coils, respectively, at least first and second wipers for each of said potentiometer means, means tying together a center tap from each of said potentiometer means, first connecting means joining a first pair of said wipers for identical movement along their respective potentiometer means, said first pair of wipers consisting of said first wiper on said first potentiometer means, and said second wiper from said second potentiometer means, second connecting means joining the second pair of said wipers also for identical movement along their respective potentiometer means, shaft means driving said rotor coil, motor means to drive said shaft means, amplifier means having as input the potential across said first wipers on each of said potentiometer means to drive said motor means and rotate said rotor coil in the direction of cancelling said input and ultimately positioning said rotor coil at a final angle nulling said input potential, means permitting adjustment of said first pair of wipers so that said first wiper therein may select a portion of said first potentiometer means indicating the magnitude of one of said input vectors, and means permitting adjustment of said second pair of wipers so that said first wiper therein may select a portion of said second potentiometer means indicating the magnitude of the other of said input vectors, whereby said final angle of said rotor coil is the polar angle of the resultant vector of said pair of input vectors and the potential across said second wipers of said first and second potentiometer means is proportional to the magnitude of said resultant vector.

7. The computer of claim 6 in which additional means is provided for indicating positionally the magnitude of said resultant vector.

8. In a computer, a rotor coil and a pair of stator coils inductively coupled to said rotor coil, means supplying a uniform A.C. voltage input to said rotor coil potentiometer means across each of said stator coils, at least first and second wipers for each of said potentiometer means, first transmission means joining a first pair of said wipers for cooperative movement along their respective potentiometer means, second transmission means joining the second pair of said wipers also for cooperative movement along their respective potentiometer means, said first pair of wipers consisting of said first wiper on the potentiometer means across one of said stator coils and said second wiper from said potentiometer means across the other of said stator coils, servo means for driving said rotor coil, said servo means having as input the potential across said first wipers on each of said potentiometer means to position said rotor coil in the direction of cancelling said input and ultimately positioning said rotor coil at an angle to null said input potential, means for adjusting the aforementioned first wipers on each of said potentiometer means independently of each other permitting selection of a portion of each potentiometer means proportional to the magnitude of a pair of input vectors to be solved whereby said final angle of said rotor coil in the polar angle of the resultant vector of said pair of input vectors and the potential across said second wipers of said second potentiometer means is proportional to the magnitude of said resultant vector, transformer means having a uniform A.C. input and potentiometer means across its output, a wiper for the latter said potentiometer means and additional servo means for driving the latter said wiper, electrical means maintaining one end of said transformer potentiometer means at the same potential as one of said second wipers, said servo means having as its input the potential across said latter wiper and the other of said second wipers and driving said latter wiper in the direction of nulling the latter input signal thereby positioning said latter wiper at a position also indicating the magnitude of the resultant vector.

9. In a computer, a rotor coil and first and second stator coils perpendicularly arranged and inductively coupled to said rotor coil, means supplying a uniform voltage input to said rotor coil, first potentiometer means across said first stator coil, provided with a first, second and third wiper, second potentiometer means across said second stator coil, provided with fourth, fifth, and sixth wipers, first means joining said third and sixth wipers for cooperative movement, second means joining said second and fourth wipers, and third means joining said first and fifth wipers also for cooperative movement, third potentiometer means provided with a uniform A.C. voltage and a sixth wiper joined to said first means for movement therewith, first servo means to rotate said rotor coil and supplied with the potential across said first and fourth wipers for driving said rotor in a direction to null the input to said first servo means, second servo means to drive said first means and supplied with the potential across said fifth and sixth wipers for actuating said sixth wiper in the direction of nulling the input to said second servo means, and means to adjust the positions of said first and fourth wipers in proportion to a pair of input vectors 90° apart in phase whereby the first and second means and movable coil will automatically be rebalanced so that said movable coil will be positioned at an angle equal to the final vector angle and said first shaft will be positioned in proportion to the magnitude of said final vector.

10. In a computer, a rotor coil and first and second stator coils perpendicularly arranged, and inductively coupled to said rotor coil, means supplying a uniform A.C. voltage input to said rotor coil, first, second and third potentiometer means across said first stator coil, each provided with a first, second and third wiper, respectively, fourth, fifth, and sixth potentiometers across said second stator coil, each provided with a fourth, fifth, and sixth wiper, respectively, means maintaining the center taps of all potentiometers at equal potential, first shaft means joining said third and sixth wipers for simultaneous movement along their respective potentiometers, second shaft means joining said second and fourth wipers, and third shaft means joining said first and fifth wipers for simultaneous movement along their respective potentiometers, a transformer having an input coil supplied with a uniform A.C. voltage and an output coil having a potentiometer thereacross with a wiper joined to said first shaft means for movement therewith, first motor means to rotate said rotor coil, first amplifier means supplied with the potential across said first and fourth wipers for driving said motor in a direction to null the input to said first amplifier means, second motor means to drive said first shaft means, second amplifier means supplied with the potential across said fifth and transformer wipers for actuating said second motor in the direction of nulling the input to said second amplifier, and means permitting adjustment of the positions of said first and fourth wipers in proportion to a pair of input vectors 90° apart in phase whereby the shaft means and movable coil will automatically be balanced so that said movable coil will be positioned at an angle equal to the final vector angle and said first shaft means will be positioned in proportion to the magnitude of said final vector.

11. A computer for solving a pair of vectors, comprising, a rotor coil and a pair of stator coils, potentiometer means across each of said stator coils, means supplying a uniform A.C. voltage to said rotor coil, a wiper for each of said potentiometers, means interconnecting both said wipers for insuring cooperative movement thereof, first servo means to drive said rotor coil, second servo means to drive said interconnecting means adjusting said wipers, means supplying input potential to said first servo means consisting of the potential difference between one input vector and the voltage selected by the position of the wiper for one said potentiometer, means supplying input potential to said second servo means consisting of the potential difference between the second input vector and the voltage selected by the position of the wiper for the other said potentiometer, said servo means rotating said rotor coil and interconnecting means in the directions of nulling the inputs to their respective amplifier inputs thereby rebalancing the wipers at a point on their respective potentiometers indicating the magnitude of the final vector which is the sum of said input vectors.

12. A computer for solving a pair of vectors, comprising, a rotor coil and a pair of stator coils, potentiometer means across each of said stator coils, a transformer consisting of an input coil and an output coil, means supplying a uniform A.C. voltage to said rotor coil and said input coil, potentiometer means across said output coil, a wiper for each of said potentiometers, means interconnecting all said wipers for insuring identical movement along their respective potentiometers, first motor means energized by a first amplifier to drive said rotor coil, second motor means energized by a second amplifier to drive said interconnecting means adjusting said wipers, means supplying input potential to said first amplifier consisting of the potential difference between one input vector and the voltage selected by the position of the wiper for a potentiometer across one of said stator coils, and means supplying input potential to said second amplifier consisting of the potential difference between the second input vector and the voltage selected by the position of the wiper for the potentiometer across the other said stator coil, whereby said motors rotate said rotor coil and interconnecting means in the directions of nulling the inputs to their respective amplifier inputs.

13. A computer for solving right angled vectors, comprising, resolver means including an input winding inductively coupled to a pair of output windings, each of the latter being fixed perpendicular to the other, means supplying a uniform A.C. voltage to said input winding, a potentiometer means coupled across each of said output windings including center tap and wiper means on each said potentiometer means, means establishing a common potential on the center taps of both potentiometer means to provide selective positioning of the wiper means according to the magnitude and sense of each of said right angled vectors, servo means for adjusting the angle between said input winding and said pair of output windings, the wiper means of each of the potentiometer means being directly connected by conductive connection to the input of the servo means to supply thereto the potential difference developed between said wiper means for operably driving the servo means in the direction of nulling said input, the angle between said input winding and said pair of output windings at null being indicative of the polar angle of the resultant vector of said right angled vectors.

References Cited in the file of this patent

UNITED STATES PATENTS

| | | |
|---|---|---|
| 2,465,624 | Agins | Mar. 29, 1949 |
| 2,467,646 | Agins | Apr. 19, 1949 |
| 2,525,636 | Bedford et al. | Oct. 10, 1950 |
| 2,706,080 | Carney et al. | Apr. 12, 1955 |

OTHER REFERENCES

Servo Mechanism Practice (Ahrendt), 1954, page 47.

UNITED STATES PATENT OFFICE

CERTIFICATE OF CORRECTION

Patent No. 2,922,579            January 26, 1960

David A. Goldman

It is hereby certified that error appears in the printed specification of the above numbered patent requiring correction and that the said Letters Patent should read as corrected below.

Column 4, line 74, for "$R_{gh}-R_f$" read -- $R_{gh}=R_f$ --; column 8, line 62, for "in" read -- is --.

Signed and sealed this 11th day of April 1961.

(SEAL)

Attest:
ERNEST W. SWIDER
Attesting Officer

ARTHUR W. CROCKER
Acting Commissioner of Patents